Nov. 16, 1926. 1,606,806
A. T. RICHARDSON
INSPECTOR'S TRACK LEVEL AND GAUGE
Filed Oct. 1, 1921
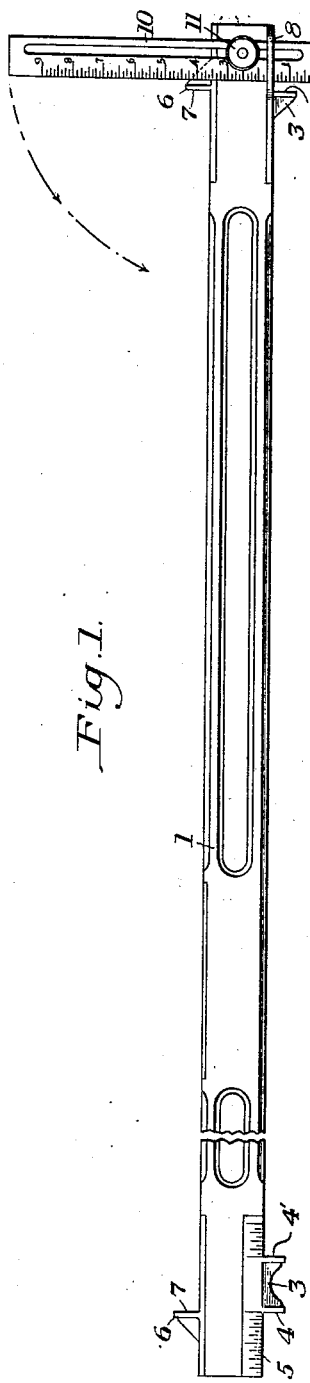
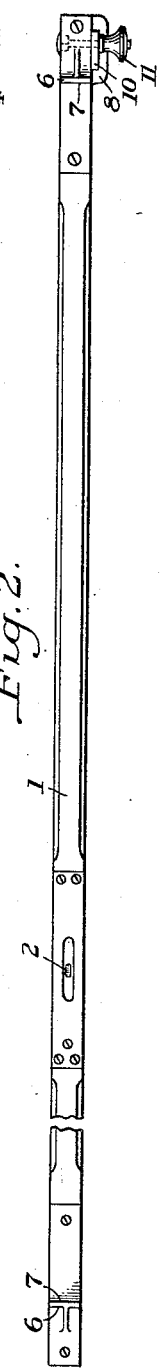
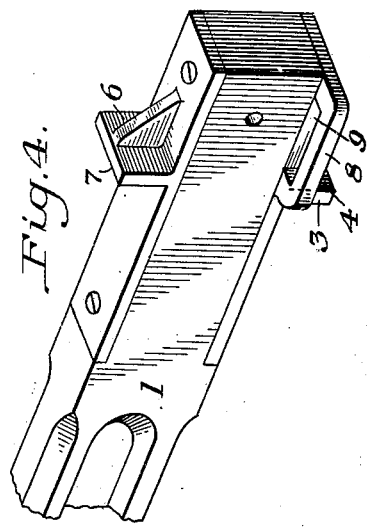
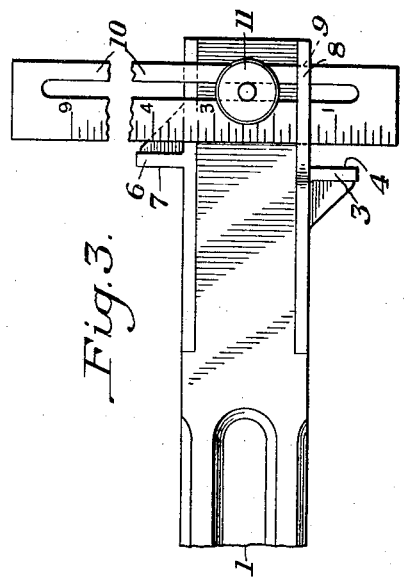
INVENTOR
Andrew T. Richardson Patented Nov. 16, 1926.

1,606,806

UNITED STATES PATENT OFFICE.

ANDREW T. RICHARDSON, OF VERONA, PENNSYLVANIA, ASSIGNOR TO VERONA TOOL WORKS, OF VERONA, PENNSYLVANIA, A CORPORATION OF PENNSYLVANIA.

INSPECTOR'S TRACK LEVEL AND GAUGE.

Application filed October 1, 1921. Serial No. 504,562.

The present invention relates broadly to measuring and testing instruments, and more particularly to an inspector's track level and gauge-testing gauge.

At the present time it is customary to test track both for the spacing of the rails and for the relative elevation thereof. Gauges for this purpose are provided with projections against which the insides of properly spaced rails will abut and with elevation scales for testing the height of the rails. These gauges after continued use may become inaccurate, thereby resulting in improper track laying or gauging. The present invention provides a master or insepector's gauge having means for testing track, for testing the rail spacing and the elevation of the rails, and with means for testing the gauges of the workmen, and also with means for testing the distance between a rail and its guard-rail.

A preferred embodiment of the present invention is illustrated in the accompanying drawings, in which—

Figure 1 is a side elevation of a gauge embodying the present invention, with the elevation scale in upright position.

Figure 2 is a top plan view of the gauge illustrated in Figure 1.

Figures 3 and 4 are detail views of portions of the gauge structure.

According to one form of the present invention, the gauge may comprise a main body portion 1 having at some convenient point intermediate its ends a level 2 of usual construction. Adjacent each end of the body 1, and on the same side thereof, is positioned a track-engaging projection 3, each having a smooth rail-engaging face 4. These projections are so positioned on the gauge that the smooth faces thereof will abut against the inside edges of properly spaced rails when the gauge is placed in a position at substantially right angles thereto. One of the projections 3 is provided with a guard-rail engaging face 4' in spaced relation to the rail-engaging face 4 thereof. This projection may, therefore, be used to test the distance between a rail and its guard-rail. Cooperating with the guard-rail engaging face 4' and the adjacent rail-engaging face 4, is a scale 5 by means of which the amount of variation of a rail from its true position with respect to the other rail, can be determined, as well as the variation of a guard-rail from its true position.

On another, and preferably the diametrically opposite, side of the body there is provided, adjacent each end, a projection 6 having a substantially smooth inner face 7. The smooth faces 4 and 7 of each pair of projections 3 and 6 are so positioned as to lie in the same transverse plane. By reason of this construction, it will be apparent that an inspector may test the gauges of other workmen by sliding the projections on such gauges, corresponding to the projections 3 of the present gauge, between the projections 6. If the faces accurately engage each other, it will be obvious that the workman's gauge does not need any adjustment. If the faces do not engage, however, the amount of adjustment required will be indicated by the scale 5 as well as by the actual space between the faces or the overlap thereof. This provides a convenient and accurate means both for testing track which has already been laid and tested by other gauges, and for testing such other gauges.

The plate carrying one of the projections 3 may be provided with a laterally extending portion 8 adapted to provide a vertically extending opening 9 through the plate. Cooperating with this plate is an elevation scale 10 slotted to permit the same to adjustably cooperate with a clamping screw 11. The length of the slot is such that when the elevation scale is not being used it may be slid upwardly the entire length of the slot out of engagement with the opening 9 and swung downwardly against the side of the body 1. When being used, the elevation scale is rigidly supported by the clamping screw and the portion 8, whereby it is maintained in position at right angles to the body 1 for testing the elevation of the rails.

It will be apparent that changes may be made in the details of construction of the present gauge to adapt the same for the various purposes which it serves, within the scope of the present claim, without departing from the spirit of the invention.

The advantages of the present gauge arise from the provision of a single instrument permitting checking of other instruments and of structures built thereby.

I claim:

In a track gauge, a body portion, a rail engaging projection adjacent one end thereof, a scale cooperating with said projection, a rail engaging projection adjacent the opposite end of said body, a guide on said last mentioned projection extending laterally of the body, a clamping screw on one side of said body portion above said guide, and an elevation scale pivotally mounted on said screw, said elevation scale having a slot therein permitting the same to be moved downwardly relatively to said screw through said guide or drawn upwardly out of engagement therewith, substantially as described.

In testimony whereof I have hereunto set my hand.

ANDREW T. RICHARDSON.